April 11, 1933.  R. W. TAYLOR  1,903,558
ARTIFICIAL BAIT
Filed March 13, 1931

Inventor
Rolland W. Taylor
By Clarence A. O'Brien
Attorney

Patented Apr. 11, 1933

1,903,558

UNITED STATES PATENT OFFICE

ROLLAND W. TAYLOR, OF REMUS, MICHIGAN

ARTIFICIAL BAIT

Application filed March 13, 1931. Serial No. 522,364.

This invention relates generally to artificial bait used in trolling and in casting and particularly to a new and novel bait of the type known as a fishing spoon which has a spiralling, spinning, wobbling motion through the water when the same is drawn therethrough on a fishing line.

It is an object of this invention to produce a new and novel device of this character which is simple and inexpensive in construction and which is extraordinarily efficient and durable, and exerts a strong lure to fish, thereby increasing the amount of sport available to those persons who enjoy fishing.

These and other objects of the invention, its nature, and its composition and arrangement and combination of parts will be readily understood to any one acquainted with the art to which this invention relates upon consulting the following description of the drawing, in which:—

Figure 1:
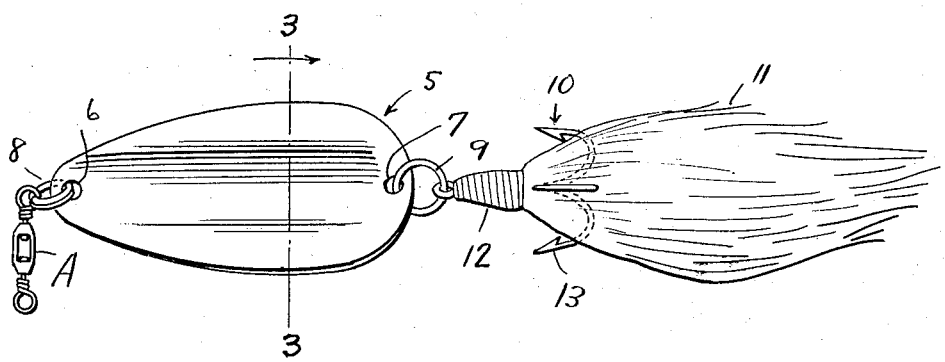
Figure 1 is a general plan view of my improved artificial bait.

Referring in detail to the drawing the numeral 5 designates generally a pear-shaped spoon which has at each end extremity along a longitudinal central axis holes 6 and 7 for the reception of attaching rings 8 and 9. As seen in Figure 1 the hole 6 is at the smaller or narrower extremity of the spoon 5 and the hole 7 is in the wide portion thereof. The ring 9, which may be a split ring in the form such as employed for a key-ring, permits easy removal of the same from the spoon or from the hook assembly attached thereto, and this ring 9 having been passed through the hole 7 has attached to it a hook assembly 10. The hook assembly 10 carries a brush or tail of horse hair or the like as indicated at 11 bound as at 12 in any suitable manner upon the shank of the hook assembly. The brush or tail will somewhat disguise and hide the hooks 13, and it trails and streams out behind the hook assembly as the spoon is drawn through the water. In the hole 6 is the split ring 8 to which is attached a suitable swivel a.

Figures 2, 3:
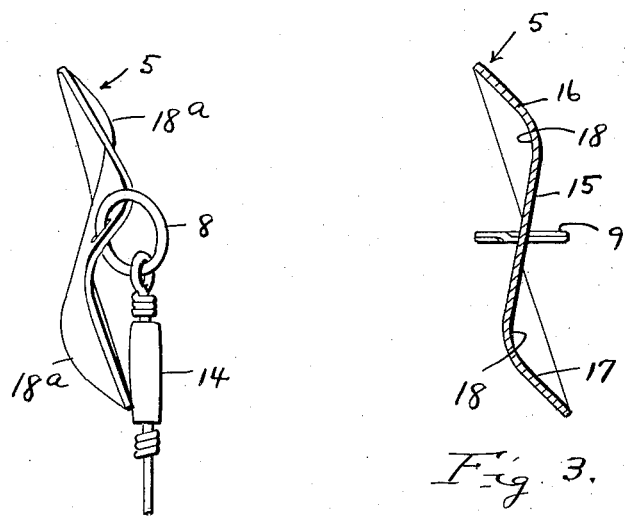
Figure 2 is an end view thereof taken from the left of Figure 1.
Figure 3 is a transverse cross sectional view taken on the line 3—3 of Figure 1 looking in the direction of the arrow.

I am aware that the attachment of snares and hook assemblies and the like and the attachment of a swivel to a spoon, is not broadly new. I predicate the novelty of this invention chiefly upon the formation of the spoon 5, which formation produces the spiralling, spinning, wobbling motion which the spoon has when moving through the water, and which is peculiar to the device of my invention. Reference to Figures 2 and 3 will disclose that the spoon 5 has a central longitudinal area 15 comparatively straight and flat, and that the portions which extend laterally from the side limits of the central portion 15 are oppositely deflected as indicated at 16 and 17 on lines which are parallel to the longitudinal axis of the spoon to provide angular concavities 18. In Figures 2 and 3 it is to be seen that the central portion 15 gradually diminishes at each end portion thereof so that the portions in which the rings 8 and 9 are attached are less wide than the central part of the portion 15. The portions 16 and 17 are hammered or pressed out so as to produce a more accentuated concavity than is produced by the bending alone, and the accentuated convexities 18a are thereby produced, so as to form pockets to engage the water at opposite angles in order to impart the spiralling, spinning, wobbling motion which is the essential activity of my improved artificial bait when used upon a fishing line. It will be obvious that the concavities 18 correspond with the convexities 18a and that extend substantially parallel to the longitudinal axis of the spoon 5.

It is to be definitely understood that I do not desire to limit the application of this invention to the particular modification set out herein to illustrate the principles thereof, and any change or changes may be made in structure or arrangement of parts and in the materials thereof, consistent with the spirit and scope of the invention.

What is claimed is:—

An artificial bait of the type described comprising a pear-shaped spoon having in its broad end a longitudinally centrally aligned hole for attaching a hook assembly and in its narrow end a longitudinally and centrally aligned hole for attaching a line coupling, the longitudinal marginal parts of the spoon being oppositely and angularly bent on lines removed from but parallel to the central longitudinal axis of the spoon, said parts being cupped for a portion of their longitudinal extent.

In testimony whereof I affix my signature.

ROLLAND W. TAYLOR.